United States Patent
Kojima et al.

(10) Patent No.: US 6,520,160 B2
(45) Date of Patent: Feb. 18, 2003

(54) INTERNAL COMBUSTION ENGINE CONTROL UNIT FOR, AND METHOD OF CONTROLLING A HYBRID VEHICLE

(75) Inventors: Masakiyo Kojima, Susono; Osamu Harada, Toyota; Katsuhiko Yamaguchi, Nissin; Yukio Kobayashi, Kasugai; Seiji Hino, Nissin; Akihiro Yamanaka, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/837,203

(22) Filed: Apr. 19, 2001

(65) Prior Publication Data
US 2001/0032621 A1 Oct. 25, 2001

(30) Foreign Application Priority Data
Apr. 21, 2000 (JP) ......................................... 2000-121571

(51) Int. Cl.[7] ............................. B60K 6/02; F02D 25/00
(52) U.S. Cl. .................................. 123/492; 123/DIG. 8
(58) Field of Search ............................ 123/492, DIG. 8

(56) References Cited

U.S. PATENT DOCUMENTS

| | | | |
|---|---|---|---|
| 5,474,052 A | * | 12/1995 | Aquino et al. ............... 123/492 |
| 5,706,788 A | * | 1/1998 | Hosoi ........................... 123/492 |
| 5,821,706 A | * | 10/1998 | Koga ........................... 318/139 |
| 5,890,365 A | * | 4/1999 | Sisti ....................... 123/DIG. 8 |
| 5,898,282 A | | 4/1999 | Drozdz et al. |
| 5,959,420 A | | 9/1999 | Boberg et al. |
| 6,092,510 A | * | 7/2000 | Przymusinski et al. ...... 123/492 |
| 6,223,721 B1 | * | 5/2001 | Bauer et al. ................. 123/492 |

FOREIGN PATENT DOCUMENTS

| | | |
|---|---|---|
| JP | A 5-328527 | 12/1993 |
| JP | A 5-328528 | 12/1993 |
| JP | A 11-173175 | 6/1999 |
| JP | A 11-210448 | 8/1999 |

* cited by examiner

Primary Examiner—Paul J. Hirsch
(74) Attorney, Agent, or Firm—Oliff & Berridge, PLC.

(57) ABSTRACT

An internal combustion engine control unit for hybrid vehicle makes an electric motor function as a main driving source for the vehicle under a predetermined condition and at the same time, controls a hybrid mechanism so as to warm up the internal combustion engine. If a requested engine output to the internal combustion engine exceeds a predetermined output or if an accelerator opening degree exceeds a predetermined opening degree, the same control unit changes the operating condition of the internal combustion engine from the warm-up operation condition to an operation condition fitting to the requested engine output.

10 Claims, 5 Drawing Sheets

INTERNAL COMBUSTION ENGINE CONTROL UNIT FOR, AND METHOD OF CONTROLLING A HYBRID VEHICLE

INCORPORATION BY REFERENCE

The disclosure of Japanese Patent Application No. 2000-121571 filed on Apr. 21, 2000 including the specification, drawings and abstract is incorporated herein by reference in its entirety.

BACKGROUND OF THE INVENTION

1. Field of Invention

The present invention relates to a technology for controlling an internal combustion engine of a hybrid vehicle having two driving sources comprised of an internal combustion engine and an electric motor.

2. Description of Related Art

In recent years, a hybrid vehicle having two driving sources comprised of an internal combustion engine and an electric motor has been developed in order to reduce fuel consumption in the internal combustion engine, emission gas discharged from the internal combustion engine, noise and the like.

The aforementioned hybrid vehicle includes an internal combustion engine, a power generator driven with part of output from the internal combustion engine, a battery for accumulating electric power generated by the power generator, an electric motor to be driven by electric power from the power generator or battery and a drive power dividing mechanism for distributing the output of the internal combustion engine selectively to the power generator and wheels.

In the hybrid vehicle having such a structure, for example, transmission of the output from the internal combustion engine to the power generator and wheels is interrupted when the vehicle is stopped or at the same time when operation of the internal combustion engine is stopped, a supply of electric power of the battery and power generator to the electric motor is stopped.

In the aforementioned hybrid vehicle, when the vehicle is started or has a low load, transmission of output from the internal combustion engine to the power generator and wheels is interrupted or operation of the internal combustion engine is stopped while electric power of the battery is applied to the electric motor. In this case, the hybrid vehicle is driven with only output of the electric motor driven with electric power from the battery.

In the aforementioned hybrid vehicle, in its normal traveling, the internal combustion engine is started so that an output of the internal combustion engine is transmitted to both the power generator and wheels, and electric power generated by the power generator is applied to the electric motor. In this case, the hybrid vehicle is driven with the output of the internal combustion engine and the output of the electric motor driven with electric power of the power generator.

In the aforementioned hybrid vehicle, when a high load is applied thereon for acceleration or the like, the internal combustion engine is started so that an output of the internal combustion engine is transmitted to both the power generator and wheels and, at the same time, electric power generated by the power generator and electric power from the battery are applied to the electric motor. In this case, the hybrid vehicle is driven with the output of the internal combustion engine and the output of the electric motor driven with electric power from the power generator and battery.

In the aforementioned hybrid vehicle, when the vehicle is decelerated or braked, transmission of the output from the internal combustion engine to the power generator and wheels is interrupted or operation of the internal combustion engine is stopped and rotation force of the wheels is transmitted to the electric motor. In this case, the electric motor functions as a power generator to regenerate power and electric power regenerated by the electric motor is charged to the battery.

In the aforementioned hybrid vehicle, if the amount of accumulated electricity of the battery drops below a predetermined value, the internal combustion engine is started and the output of the internal combustion engine is increased. Then, the output of the internal combustion engine is transmitted to the power generator and all or part of electric power generated by the power generator is charged.

Because the internal combustion engine can be operated effectively in the hybrid vehicle, reduction of fuel consumption rate, reduction of the discharge amount of emission gas, reduction of emission gas and reduction of noise can be achieved.

Further, in the aforementioned hybrid vehicle, if the temperature of the emission gas purifying catalyzer or emission gas purifying part such as air-fuel ratio sensor is less than an activation temperature, the vehicle is started with the electric motor as a main drive source and then, by worsening net heat efficiency of the internal combustion engine, heat amount of emission gas is increased so as to warm up the emission gas purifying part or carry out warm-up operation control.

However, because the aforementioned warm-up operation control takes warm-up of the emission gas purifying part, even if acceleration request for the vehicle is generated during execution of the warm-up operation control, the output of the internal combustion engine cannot be increased. As a result, a desired vehicle driving power cannot be obtained so that drivability may be worsened.

As a technology relating to the invention, Japanese Patent Application Laid-Open No. 11-173175 has disclosed an internal combustion engine control unit for a hybrid vehicle. In the aforementioned internal combustion engine control unit for the hybrid vehicle described in the same publication, a hybrid mechanism for driving the vehicle by selectively using the internal combustion engine and electric motor is provided so as to drive the vehicle with the electric motor as a main drive source when the temperature of the emission gas purifying part is less than its activation temperature and, at the same time, warm up the internal combustion engine. If engine output higher than a maximum output which can be generated by the internal combustion engine being warmed up is requested when the internal combustion engine is warmed up, the operating condition of the internal combustion engine is changed over from the warm-up operation to an operating condition corresponding to the requested engine output.

In the aforementioned internal combustion engine control unit for the hybrid vehicle, the requested engine output is calculated with accelerator opening degree and traveling velocity (or engine rotation number) of the vehicle as parameters.

Thus, when the vehicle is traveling at low speed, even if the accelerator opening degree is large at that time, the requested engine output may sometimes drop below an output which can be generated by the internal combustion engine being warmed up (hereinafter referred to as warm-up time engine output).

Therefore, if the accelerator opening degree is increased quickly with a slow traveling speed like when the vehicle is accelerated from its slow traveling condition, it is estimated that the requested engine output drops below the warm-up time engine output at an initial phase of the acceleration in which the vehicle speed drops and that if the vehicle speed is increased to some extent in the accelerating process, the requested engine output is increased over the warm-up time engine output.

In the aforementioned case, until the requested engine output surpasses the warm-up time engine output, the internal combustion engine is operated in the warm-up condition and after the requested engine output exceeds the warm-up time engine output, the operation of the internal combustion engine is turned to an operating condition fitting to the requested engine output. That is, the operating condition of the internal combustion engine is changed from the warm-up operation condition to the operating condition fitting to the requested engine output during acceleration of the vehicle.

As a result, a change in the output of the internal combustion engine occurs during acceleration of the vehicle, so that a shock may occur due to that output change.

SUMMARY OF THE INVENTION

The invention has been achieved in view of the above described problems and provides a technology capable of suppressing an occurrence of a shock due to change-over from a warm-up operation condition to an operation condition fitting to a requested engine output in a hybrid vehicle in which when a necessity of warming up an emission gas purifying part occurs, an electric motor is activated as a main driving source while an internal combustion engine is warmed up, thereby drivability being improved.

An internal combustion engine control unit for hybrid vehicle of one aspect of the invention controls a hybrid mechanism so as to make the electric motor function as a main driving source for the vehicle and warm up the internal combustion engine under a predetermined condition and inhibits the warm-up operation of the internal combustion engine if the requested engine output to the internal combustion engine exceeds a predetermined output or an accelerator opening degree exceeds a predetermined opening degree.

In the internal combustion engine control unit for the hybrid vehicle having such a structure, at the same time when the internal combustion engine is warmed up under a predetermined condition, the electric motor drives the vehicle as a main driving source.

If, when the internal combustion is in the warm-up operation condition, the requested engine output to the internal combustion engine exceeds a predetermined output (for example, a maximum output which can be generated by an internal combustion engine in the warm-up operation condition) or an accelerator opening degree exceeds a predetermined opening degree, the warm-up operation of the internal combustion engine is inhibited. After the inhibition, the operating condition of the internal combustion engine may be changed from the warm-up operation condition to a predetermined operation condition.

That is, according to the control unit of the invention, if the accelerator opening degree exceeds the predetermined opening degree as well as the requested engine output to the internal combustion engine exceeds the predetermined output when the internal combustion engine is in the warm-up operation condition, the operating condition of the internal combustion engine is changed form the warm-up operation condition to the predetermined operation condition. The predetermined operating condition mentioned here refers to an operating condition fitting to the requested engine output.

As a result, if the accelerator opening degree is increased with a slow traveling speed like when the vehicle is accelerated from its slow traveling condition, the operating condition of the internal combustion engine is changed over from the warm-up operation condition to the predetermined operation condition. Thus, the operating condition of the internal combustion engine is not changed during acceleration of the vehicle.

Further, the control unit may estimate a period in which the operating condition should be changed from the warm-up operation condition to the predetermined operation condition and change the operating condition of the internal combustion engine from the warm-up operation condition to the predetermined operation condition gradually prior to the estimated changing period.

In this case, the internal combustion engine in the warm-up operation condition is turned to the predetermined operation condition gradually just before the changing period is reached, so that the output of the internal combustion engine is increased gradually just before the changing period. Therefore, it is possible to make the output of the internal combustion engine agree with the predetermined requested engine output while suppressing a sudden change of the output of the internal combustion engine.

The embodiments of the present invention are not restricted to the above described control unit for the hybrid vehicle. Other embodiments of the present invention are, for example, a hybrid vehicle or hybrid system provided with the aforementioned internal combustion engine control unit and a control method for the internal combustion engine of the same hybrid vehicle.

BRIEF DESCRIPTION OF THE DRAWINGS

The invention will be described with reference to the following drawings in which like reference numerals designate like elements and wherein.

DETAILED DESCRIPTION OF PREFERRED EMBODIMENTS

Hereinafter, the preferred embodiments of the internal combustion engine control unit of a hybrid vehicle of the present invention will be described in detail with reference to the accompanying drawings.

Figure 1:
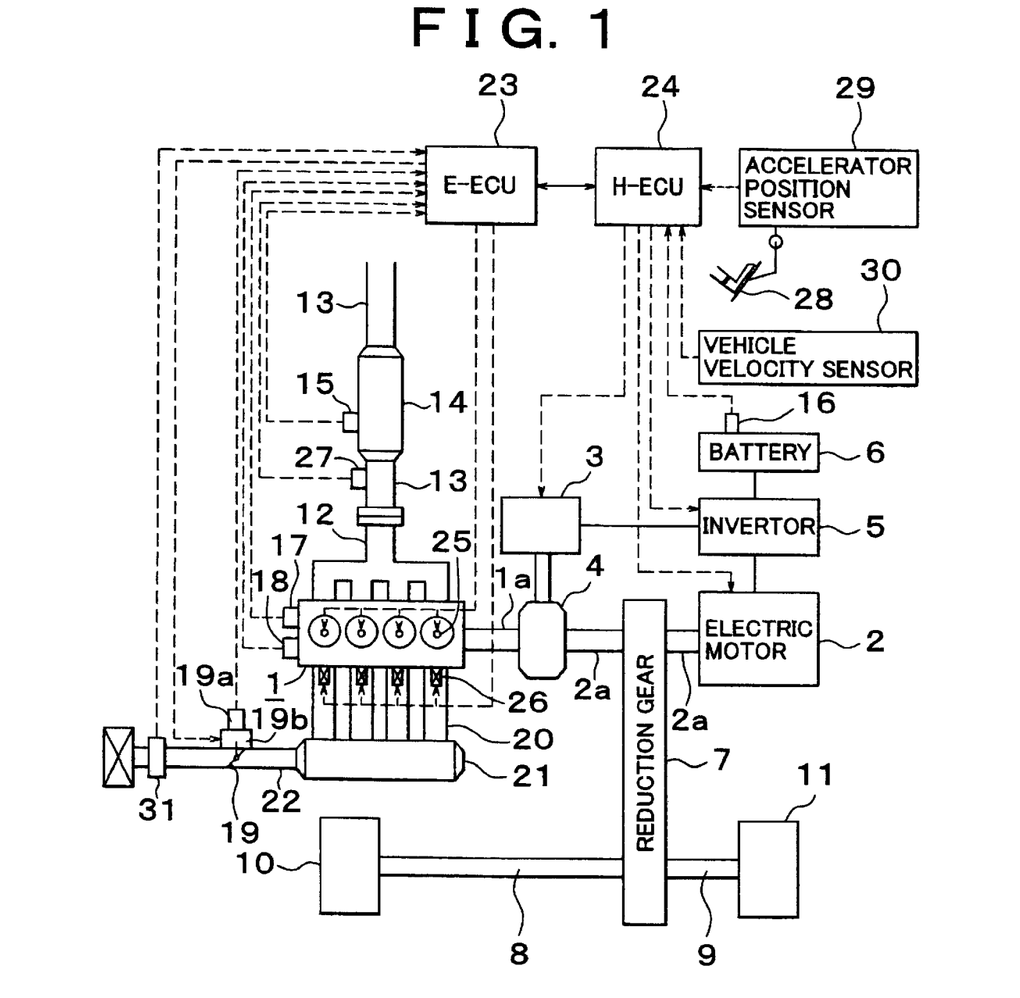
FIG. 1 is a schematic structure diagram of a hybrid mechanism of a hybrid vehicle employing an internal combustion engine control unit of the present invention.

FIG. 1 is a diagram showing a schematic structure of the hybrid mechanism loaded on a hybrid vehicle employing the internal combustion engine control unit of the present invention.

The hybrid mechanism shown in FIG. 1 contains two driving sources, that is, an internal combustion engine 1 and an electric motor 2 as a motor of the present invention.

The internal combustion engine 1 is a water-cooled 4-stroke/cycle gasoline engine having four cylinders. This internal combustion engine 1 contains ignition plugs 25 such that they command combustion chambers (not shown) of the respective cylinders. Additionally, a crank position sensor 17 is provided for outputting a pulse signal each time when a crank shaft, which is an engine output shaft, is rotated by a predetermined angle (for example, 10° CA) and a water temperature sensor 18 is provided for outputting an electric signal corresponding to the temperature of cooling water flowing through a water jacket formed in the internal combustion engine 1.

Intake branch pipes 20 comprised of four branch pipes are connected to the internal combustion engine 1. Each of the intake branch pipes 20 communicates with a combustion chamber of each cylinder through an intake port (not shown) and is connected to a surge tank 21 for controlling pulsation of air intake. A fuel injection valve 26 is attached at a position just above the internal combustion engine 1 in each of the intake branch pipes 20 such that its injection port commands the intake port.

An air intake pipe 22 is connected to the surge tank 21 and the air intake pipe 22 is connected to an air cleaner box (not shown) An air flow meter 31 is provided for outputting an electric signal corresponding to mass of new air flowing in the air intake pipe 22. A throttle valve 19 for adjusting the flow rate of new air flowing in the air intake pipe 22 is provided in the downstream of the air intake pipe 22 relative to the air flow meter 31.

The throttle valve 19 incorporates a throttle actuator 19b comprised of a stepper motor or the like for driving the throttle valve 19 corresponding to the amount of applied current and a throttle position sensor 19a for outputting an electric signal corresponding to the degree of an opening of the throttle valve 19.

An emission air branch pipe 12 is connected to the internal combustion engine 1 such that four branch pipes thereof are converged to a single gathering pipe. Each of the four branches of the emission air branch pipe 12 communicates with a respective combustion chamber of each cylinder through a discharge port (not shown). The emission air branch pipe 12 is connected to a discharge pipe 13 and the discharge pipe 13 is connected to a muffler (not shown) in the downstream.

An emission gas purifying catalyzer 14 for purifying harmful gas component in emission gas is provided in the discharge pipe 13. The emission gas purifying catalyzer 14 is composed of ternary catalyzer for purifying carbon hydride (HC), carbon monoxide (CO) and nitrogen oxides ($NO_x$) when the air-fuel ratio of emission air flowing into the emission gas purifying catalyzer 14 is a predetermined air-fuel ratio in the vicinity of theoretical air-fuel ratio, reservation reduced type $NO_x$ catalyzer, which absorbs nitrogen oxides ($NO_x$) in emission gas when air-fuel ratio of the emission gas flowing into the emission gas purifying catalyzer 14 and discharges reserved nitrogen oxide ($NO_x$) to reduce and purify the emission gas when air-fuel ratio of the emission gas flowing into the emission gas purifying catalyzer 14 is of theoretical air-fuel ratio or rich air-fuel ratio or selection reduced type $NO_x$ for purifying nitrogen oxide ($NO_x$) when air-fuel ratio of the emission gas flowing into the emission gas purifying catalyzer 14 is lean air-fuel ratio while a predetermined reducing agent exists, or composed by combination of these catalyzers.

In the discharge pipe 13, an air-fuel ratio sensor 27 for outputting an electric signal corresponding to the air-fuel ratio of the emission gas flowing into the emission gas purifying catalyzer 14 is mounted just in the upstream of the emission gas purifying catalyzer 14.

The emission gas purifying catalyzer 14 is provided with a catalyzer temperature sensor 15 for outputting an electric signal corresponding to the temperature of the emission gas purifying catalyzer 14. The catalyzer temperature sensor 15 is not always necessary but it is permissible to estimate the catalyzer temperature of the emission gas purifying catalyzer 14 with various parameters (for example, cooling water temperature, passage of time since start of the internal combustion engine 1 and the like). In case of an internal combustion engine provided with the emission gas temperature sensor for detecting the temperature of emission gas, the catalyzer temperature of the emission gas purifying catalyzer 14 may be estimated from an output signal value of the emission gas temperature sensor.

A crank shaft, which is an output shaft of the internal combustion engine 1, is coupled with an output shaft 1a and the output shaft 1a is coupled with a drive power dividing mechanism 4. The drive power dividing mechanism 4 is mechanically connected to a power generator 3 and a rotation shaft (motor rotation shaft) 2a of an electric motor 2.

The drive power dividing mechanism 4 is comprised of, for example, planetary carrier supporting a pinion gear freely rotatably, ring gear disposed outside the planetary carrier, and planetary gear having a sun gear disposed inside the planetary carrier. A rotation shaft of the planetary carrier is coupled with the output shaft 1a, the rotation shaft of the ring gear is coupled with the rotation shaft 2a of the motor, and the rotation shaft of the sun gear is coupled with the power generator 3.

A reduction gear 7 is coupled with the rotation shaft 2a of the electric motor 2 and wheels, which are driving wheels, are coupled with the reduction gear 7 through drive shafts 8, 9. The reduction gear 7 is constituted by combining plural gears and reduces a rotation speed of the rotation shaft 2a and transmits it to the drive shafts 8, 9.

The power generator 3 is connected electrically to an inverter 5 and the inverter 5 is electrically connected to a battery 6 and the electric motor 2.

The power generator 3 is constituted of an AC synchronous electric motor and if excitation current is applied thereto, it converts kinetic energy inputted from the internal combustion engine 1 through the drive power dividing mechanism 4 to electric energy so as to generate electric power. If a driving power from the battery 6 is applied to the power generator 3 upon startup of the internal combustion engine 1, it acts as a starter motor of the internal combustion engine 1.

The battery 6 is constituted by connecting plural nickel hydrogen batteries in series. The battery 6 is provided with a SOC controller 16 for calculating a state of charge of the battery 6 from an integration value of discharge current amount and charge current amount of the battery 6.

The electric motor 2 is constituted of an AC synchronous motor and, if an electric power generated by the power generator 3 and/or electric power from the battery 6 is applied, the rotation shaft 2a of the motor is rotated at a torque corresponding to the magnitude of applied electric power.

Excitation current from the battery 6 is applied to the electric motor 2 when a vehicle is decelerated, so that it acts as a power generator so as to carry out so-called power regeneration for converting kinetic energy transmitted from the wheels 10, 11 to the rotation shaft 2a of the motor through the drive shafts 8, 9 and the reduction gear 7 to electric energy.

The inverter 5 is an electric power converter composed of plural power transistors in combination and selectively changes over application of electric power generated by the power generator 3 to the battery 6, application of the electric power generated by the power generator 3 to the electric motor 2, application of the electric power accumulated in the battery 6 to the electric motor 2 and application of the electric power regenerated by the electric motor 2 to the battery 6.

Because, according to this embodiment, the power generator 3 is constituted of AC synchronous motor and the battery 6 is constituted of a DC battery, when applying electric power generated by the power generator 3 to the battery 6, the inverter 5 converts AC voltage generated by the power generator 3 to DC voltage and then applies it to the battery 6.

Further, because the electric motor 2 is constituted of AC synchronous motor and the battery 6 is constituted of a DC battery, when applying electric power of the battery 6 to the electric motor 2, the inverter 5 converts DC voltage of the battery 6 to AC voltage and after that, applies it to the electric motor 2. When applying electric power regenerated by the electric motor 2 to the battery 6, it converts AC voltage regenerated by the electric motor 2 to DC voltage and after that, applies it to the battery 6.

The hybrid mechanism having such a structure contains an electronic control unit (E-ECU) 23 for controlling the internal combustion engine 1 and an electronic control unit (H-ECU) 24 for controlling the entire hybrid mechanism synthetically. These E-ECU23 and H-ECU 24 are connected to each other through an interactive communication line.

A catalyzer temperature sensor 15, a crank position sensor 17, a water temperature sensor 18, a throttle position sensor 19a, air-fuel ratio sensor 27, an air flow meter 31 and the like are connected to the E-ECU 23 through electric wiring so that output signals from the respective sensors are inputted to the E-ECU 23.

A throttle actuator 19b, an ignition plug 25 and a fuel injection valve 26 are connected to the E-ECU 23 through electric wiring so that a control signal can be transmitted from the E-ECU 23 to the throttle actuator 19b, the ignition plug 25 and the fuel injection valve 26.

The SOC controller 16, an accelerator position sensor 29 for outputting an electric signal corresponding to an operating amount (accelerator opening degree) of the accelerator pedal 28 mounted in the vehicle compartment, a vehicle speed sensor 30 for outputting an electric signal corresponding to a traveling speed of the vehicle and the like are connected to the H-ECU 24 through electric wiring and output signal of each sensor is inputted to the H-ECU 24.

The H-ECU 24 is connected to the electric motor 2, the power generator 3 and the inverter 5 through electric wiring so that a control signal can be transmitted from the H-ECU 24 to the electric motor 2, the power generator 3 and the inverter 5.

In the control system having such a structure, the H-ECU 24 controls the electric motor 2, the power generator 3, and the inverter 5 according to output signals from the accelerator position sensor 29, the SOC controller 16 and the like and controls the internal combustion engine 1 through the E-ECU 23.

For example, if the ignition switch is changed from OFF to ON, the H-ECU 24 controls the E-ECU 23 and the inverter 5 to start the internal combustion engine 1. More specifically, the H-ECU 24 controls the inverter 5 so as to apply a driving electric power from the battery 6 to the power generator 3 and actuates the power generator 3 as a starter motor. Then, it transmits an engine start request signal to the E-ECU 23 to actuate the ignition plug 25, the throttle valve 19 and the fuel injection valve 26.

In this case, in the drive power dividing mechanism 4, the sun gear coupled with the power generator 3 is rotated and the ring gear coupled with the wheels 10, 11 is stopped. Therefore, substantially all of rotation torque of the sun gear is transmitted to the planetary carrier.

Because the planetary carrier of the drive power dividing mechanism 4 is coupled with the output shaft 1a of the internal combustion engine 1, if the planetary carrier is rotated by receiving a rotation torque of the sun gear, the output shaft 1a is rotated correspondingly.

At this time, the E-ECU 23 actuates the throttle valve 19, the ignition plug 25 and the fuel injection valve 26 so as to achieve cranking of the internal combustion engine 1, so that the internal combustion engine 1 is started.

After the internal combustion engine 1 is started, if the temperature of cooling water rises over a predetermined temperature and the temperature of the emission gas purifying catalyzer 14 rises over a predetermined temperature, the H-ECU 24 transmits an engine stop request signal to the E-ECU 23 to stop the operation of the internal combustion engine 1.

If the vehicle is stopped with the ignition switch ON, the H-ECU 24 transmits an engine stop request signal to the E-ECU 23 to stop the operation of the internal combustion engine 1 and controls the inverter 5 to stop the rotation of the electric motor 2.

Under certain conditions, when the vehicle is stopped, the H-ECU 24 inhibits stop of the operation of the internal combustion engine 1 or controls the inverter 5 and the E-ECU 23 to restart the internal combustion engine 1 stopped temporarily. These conditions include a situation where an output signal value (signal value indicating charge condition of the battery 6) of the SOC controller 16 is below a predetermined standard value, a case where the necessity of actuating auxiliary devices such as a compressor of a compartment air conditioner to be driven using part of the output of the internal combustion engine 1 is generated, a situation where a necessity of warming up the internal combustion engine 1 and emission gas purifying system is generated, and the like.

To restart the internal combustion engine 1, first, the H-ECU 24 transmits an engine start request signal to the E-ECU 23 and controls the inverter 5 to supply a driving electric power from the battery 6 to the power generator 3, thereby making the power generator 3 function as a stator motor.

Subsequently, after the internal combustion engine 1 is restarted, the H-ECU 24 controls the inverter 5 so as to apply excitation current from the battery 6 to the power generator 3, thereby making the power generator 3 function as a power generator.

In this case, the output shaft 1a is rotated by an output of the internal combustion engine 1 so that a rotation torque of the output shaft 1a is transmitted to the planetary carrier of the drive power dividing mechanism 4.

Here, in the drive power dividing mechanism 4, the ring gear coupled with the wheels 10, 11 is stopped, so that substantially all of the rotation torque of the planetary carrier is transmitted to the sun gear. The rotation torque transmitted from the planetary carrier to the sun gear is transmitted to the power generator 3 coupled with the sun gear. That is, substantially all of the kinetic energy outputted from the internal combustion engine 1 is transmitted to the power generator 3.

As a result, the power generator 3 converts substantially all of the kinetic energy outputted from the internal combustion engine 1 to electric energy so as to generate power. Then, all electric power generated by the power generator 3 is charged to the battery 6.

If the vehicle is started from its stop condition, the H-ECU 24 controls the hybrid mechanism to drive the vehicle with only electric power from the battery 6. More specifically, the H-ECU 24 controls the E-ECU 23 so as to keep operation stop condition of the internal combustion engine 1 and controls the inverter 5 so as to apply a driving electric power from the battery 6 to the electric motor 2.

If a driving electric power is supplied from the battery 6 to the electric motor 2, the rotation shaft 2a of the electric motor 2 is rotated, so that the rotation torque of the rotation shaft 2a is transmitted to the wheels 10, 11 through the reduction gear 7 and the drive shafts 8, 9. Consequently, the vehicle is started.

Under certain conditions, when the vehicle is started, the H-ECU 24 inhibits stop of the operation of the internal combustion engine 1 or controls the inverter 5 and the E-ECU 23 to restart the internal combustion engine 1 stopped temporarily. The conditions include a situation where an output signal value of the SOC controller 16 is below a predetermined standard value, a case where a necessity of actuating auxiliary devices such as a compressor of a compartment air conditioner to be driven using part of output of the internal combustion engine is generated, a situation where a necessity of warming up the internal combustion engine 1 and emission gas purifying system is generated, and the like.

To restart the internal combustion engine 1, first, the H-ECU 24 transmits an engine start request signal to the E-ECU 23 and controls the inverter 5 to supply a driving electric power from the battery 6 to the power generator 3, thereby making the power generator 3 function as a stator motor.

Subsequently, after the internal combustion engine 1 is restarted, the H-ECU 24 controls the inverter 5 so as to apply excitation current from the battery 6 to the power generator 3, thereby making the power generator 3 function as a power generator.

In this case, the output shaft 1a is rotated by an output of the internal combustion engine 1 so that a rotation torque of the output shaft 1a is transmitted to the planetary carrier of the drive power dividing mechanism 4 and distributed from the planetary carrier to the sun gear and ring gear.

The rotation torque distributed from the planetary carrier to the sun gear is transmitted to the power generator 3 coupled with the sun gear. The power generator 3 converts kinetic energy transmitted from the sun gear to electric energy so as to generate power. Electric power generated by the power generator 3 is distributed by the inverter 5 to the battery 6 and the electric motor 2. The electric motor 2 rotates the rotation shaft 2a with electric power supplied from the power generator 3.

The rotation torque distributed from the planetary carrier to the ring gear is transmitted to the rotation shaft 2a of the motor coupled with the ring gear.

As a result, the rotation shaft 2a of the motor is rotated at a torque composed of a torque outputted from the electric motor 2 and a rotation torque transmitted from the ring gear of the drive power dividing mechanism 4. The rotation torque of the rotation shaft 2a of the motor is transmitted to the wheels 10, 11 through the reduction gear 7 and the drive shafts 8, 9.

Therefore, if the internal combustion engine 1 is restarted upon start of the vehicle, the vehicle is driven with an output transmitted from the internal combustion engine 1 to the rotation shaft 2a of the motor through the drive power dividing mechanism 4 and electric power generated using an output transmitted from the internal combustion engine 1 to the power generator 3 through the drive power dividing mechanism 4. That is, the vehicle is driven with only an output of the internal combustion engine 1.

If the vehicle is changed from start condition to normal traveling condition, the H-ECU 24 controls the E-ECU 23 so as to start the internal combustion engine 1 and controls the inverter 5 to stop a supply of driving electric power from the battery 6 to the electric motor 2, so that the vehicle is driven with only an output of the internal combustion engine 1.

More specifically, the H-ECU 24 calculates an output requested by a driver to the hybrid mechanism (hereinafter referred to as requested output) with an output signal value (accelerator opening degree) of the accelerator position sensor 29 and an output signal value (vehicle velocity) of a vehicle velocity sensor 30, in order to determine an output requested to the internal combustion engine 1 (hereinafter referred to as requested engine output), an output requested to the electric motor 2 (hereinafter referred to as requested motor output) and a target engine rotation speed of the internal combustion engine 1 in order to satisfy the aforementioned requested output.

The H-ECU 24 transmits the requested engine output and the target engine rotation speed to the E-ECU 23 and controls the inverter 5 according to the requested motor output.

After receiving the requested engine output and target engine rotation speed from the H-ECU 24, the E-ECU 23 calculates a target engine torque by dividing the requested engine output by the target engine rotation speed and then calculates a target throttle opening degree of the throttle valve 19 based on the target engine torque.

Then, the E-ECU 23 controls the throttle actuator 19b according to the target throttle opening degree. The E-ECU 23 inputs an output signal value (intake air amount) of the air flow meter 31 when a time interval from the actual opening degree of the throttle valve 19 coincides with the target throttle opening degree until new air near the throttle valve 19 reaches the internal combustion engine 1 or air intake response delay time passes so as to determine fuel injection amount, fuel injection timing and ignition timing based on that intake air amount. The E-ECU 23 controls the fuel injection valve 26 and the ignition plug 25 according to the determined fuel injection amount, fuel injection timing and ignition timing.

The H-ECU 24 adjusts excitation current to be applied to the power generator 3 so as to control the rotation speed of the power generator 3, so that the engine rotation speed of the internal combustion engine 1 is converged to a target rotation speed.

As a result, when the vehicle is in a normal traveling condition, the vehicle is driven with only the output (including an output transmitted from the internal combustion engine 1 to the rotation shaft 2a of the motor through the drive power dividing mechanism 4 and electric power generated by using an output transmitted from the internal combustion engine 1 to the power generator 3 through the drive power dividing mechanism 4) of the internal combustion engine 1.

If the battery 6 needs to be charged when the vehicle is the normal traveling condition, the H-ECU 24 controls the E-ECU 23 to increase an output of the internal combustion engine 1 and at the same time, controls the inverter 5 to increase excitation current applied from the battery 6 to the power generator 3. Consequently, power generation is increased while maintaining the requested output.

If the vehicle is accelerated, the H-ECU 24 calculates a requested output, requested engine output and requested motor output like the above described normal traveling time and then controls the internal combustion engine 1 through the E-ECU 23 and the electric motor 2 through the inverter 5.

When controlling the inverter 5, the H-ECU 24 controls so as to apply not only electric power generated by the power generator 3 but also electric power of the battery 6 to the electric motor 2 and increases an output to the electric motor 2.

As a result, when the vehicle is accelerated, the vehicle is driven with the output of the internal combustion engine 1 (including an output transmitted from the internal combustion engine 1 to the rotation shaft 2$a$ of the motor through the drive power dividing mechanism 4 and electric power generated by using an output transmitted from the internal combustion engine 1 to the power generator 3 through the drive power dividing mechanism 4) and electric power from the battery 6.

If the vehicle is decelerated or braked, the H-ECU 24 transmits an engine stop request signal to the E-ECU 23 to stop the operation of the internal combustion engine 1 (stop fuel injection control and ignition control) and controls the inverter 5 to stop the operations of the power generator 3 and the electric motor 2.

Subsequently, the H-ECU 24 controls the inverter 5 to apply excitation current from the battery 6 to the electric motor 2 so as to allow the electric motor 2 to operate as a power generator, and carries out power regeneration for converting kinetic energy transmitted from the wheels 10, 11 to the rotation shaft 2$a$ of the motor through the drive shafts 8, 9 and the reduction gear 7 to electric energy. Electric power regenerated by the electric motor 2 is charged to the battery 6 through the inverter 5.

Next, warm-up operation control of the hybrid mechanism according to this embodiment will be described.

When the internal combustion engine 1 is started to meet a request from the H-ECU 24, the E-ECU 23 inputs output signal values of the water temperature sensor 18 and catalyzer temperature sensor 15. If the output signal of the water temperature sensor 18 is less than a predetermined temperature or the output signal value of the catalyzer temperature sensor 15 is less than an activation temperature, the E-ECU 23 transmits a warm-up operation request to the H-ECU 24 in order to achieve warm-up of the internal combustion engine 1 and activation of the emission gas purifying catalyzer 14.

If the warm-up operation request from the E-ECU 23 is received, the H-ECU 24 calculates a requested output from the output signal value (accelerator opening degree) of the accelerator position sensor 29 and the output signal value (vehicle velocity) of the vehicle velocity sensor 30. Next, the internal combustion engine 1 in warm-up operation condition calculates a maximum output which can be outputted (hereinafter referred to as warm-up time engine output).

Further, the H-ECU 24 calculates an output obtained by applying electric power to the electric motor 2 from the battery 6 (hereinafter referred to as battery output) according to an output signal value (charge condition of the battery 6) of the SOC controller 16.

The H-ECU 24 sums the warm-up time engine output with the battery output and calculates a maximum output which can be outputted from the hybrid mechanism when the warm-up operation control is executed (hereinafter referred to as warm-up time total output) to determine whether the warm-up time total output is more than the requested output.

If it is determined that the warm-up time total output is more than the requested output, the H-ECU 24 transmits a signal for permitting warm-up operation (warm-up operation permission signal) to the E-ECU 23. On the other hand, if it is determined that the warm-up time total output is less than the requested output, the H-ECU 24 transmits a signal for inhibiting the warm-up operation (warm-up operation inhibition signal) to the E-ECU 23.

If the warm-up operation permission signal from the H-ECU 24 is received, the E-ECU 23 writes "1" into a warm-up operation permission flag storage region set preliminarily in RAM incorporated in the E-ECU 23 and if the warm-up operation inhibition signal from the H-ECU 24 is received, the E-ECU 23 writes "0" into the warm-up operation permission flag storage region.

According to this embodiment, when transmitting the warm-up operation inhibition signal and the warm-up operation permission signal to the E-ECU 23, the H-ECU 24 calculates a requested engine output like when the vehicle is in the normal traveling condition, attaches the requested engine output to the warm-up operation inhibition signal and the warm-up operation permission signal, and then transmits them to the E-ECU 23.

If "0" is stored in the warm-up operation permission flag region, the E-ECU 23 controls the operation condition of the internal combustion engine 1 according to a requested engine output from the H-ECU 24. If "1" is stored in the warm-up operation permission flag storage region, the E-ECU 23 warms up the internal combustion engine 1 without considering the requested engine output from the H-ECU 24.

When warming up the internal combustion engine 1, the E-ECU 23 calculates an actual engine rotation number (hereinafter referred to as actual engine rotation number) based on a time interval in which the crank position sensor 17 outputs a pulse signal and determines a throttle opening degree, fuel injection amount, fuel injection timing and ignition timing with the actual engine rotation number and the warm-up time engine output as parameters.

A ROM (not shown) incorporated in the E-ECU 23 contains a warm-up time throttle opening degree control map indicating a relationship among actual engine rotation number, warm-up time engine output and throttle opening degree, a warm-up time fuel injection amount control map indicating a relationship among actual engine rotation number, warm-up time engine output and fuel injection amount, a warm-up time fuel injection timing control map indicating a relationship among actual engine rotation number, warm-up time engine output and fuel injection timing, a warm-up time ignition timing control map indicating a relationship among actual engine rotation number, warm-up time engine output and ignition timing, and the like. The E-ECU 23 determines the throttle opening degree, fuel injection amount, fuel injection timing and ignition timing according to the above described various control maps.

If the throttle opening degree, fuel injection amount, fuel injection timing and ignition timing are determined using the above described various control maps, the E-ECU 23 controls the throttle actuator 19b, fuel injection valve 26 and ignition plug 25 according to the throttle opening degree, fuel injection amount, fuel injection timing and ignition timing.

As a method for warming up the internal combustion engine 1, for example, a method of delaying ignition timing of each cylinder of the internal combustion engine 1 can be exemplified. Because, according to this method, combustion velocity of mixed gas in each cylinder is delayed, the temperature of combusted mixed gas when the exhaust valve is opened is higher than usually.

In this case, combusted mixed gas having a higher temperature than usual is discharged from each cylinder so that a relatively large amount of heat possessed by the combusted mixed gas is transmitted to the emission gas purifying catalyzer 14. As a result, the temperature of the emission gas purifying catalyzer 14 rises up to an activation temperature early.

If ignition delay control is carried out, it is preferable to delay the ignition timing of each cylinder gradually at a predetermined change-over speed so as to restrict an output change of the internal combustion engine 1. Further, when terminating the warm-up operation of the internal combustion engine 1, it is preferable to advance the ignition timing of each cylinder gradually at a predetermined change-over speed so as to restrict an output change of the internal combustion engine 1.

If, when the internal combustion engine 1 is in the warm-up operation condition, the requested output to the hybrid mechanism is increased or the requested output becomes higher than the warm-up time total output, the H-ECU 24 transmits the warm-up operation inhibition signal and requested engine output to the E-ECU 23.

In this case, the E-ECU 23 terminates the warm-up operation of the internal combustion engine 1 and controls the operation condition of the internal combustion engine 1 according to a requested engine output from the H-ECU 24.

Because the requested output to the hybrid mechanism is calculated with accelerator opening degree and vehicle velocity as parameters, if the vehicle is accelerated from its slow traveling condition, the requested output drops below the warm-up time total output just at the initial phase of the acceleration when the vehicle speed drops. It is estimated that when the vehicle speed is increased in a subsequent acceleration process, the requested output may be higher than the warm-up time total output.

In this case, until the requested output surpasses the warm-up time total output in the vehicle acceleration process, the internal combustion engine 1 is warmed up and, after the requested output surpasses the warm-up time total output, the internal combustion engine 1 is operated in normal condition. That is, the operating condition of the internal combustion engine is changed from warm-up operation condition to normal operation condition during acceleration of the vehicle.

As a result, an output change of the internal combustion engine may occur during acceleration of the vehicle so that a shock may occur due to the output change.

Thus, in the internal combustion engine control unit for the hybrid vehicle according to this embodiment, the H-ECU 24 inhibits execution of the warm-up operation control if the accelerator opening degree exceeds a predetermined opening degree as well as if the requested output exceeds the warm-up time total output. When the internal combustion engine 1 is in the warm-up operation condition, if the requested output exceeds the warm-up time total output or the accelerator opening degree exceeds a predetermined opening degree, the H-ECU 24 transmits the warm-up operation inhibit signal and the requested engine output to the E-ECU 23.

As a result, if, when the internal combustion engine 1 is in warm-up operation condition and the vehicle is traveling slowly, the accelerator opening degree exceeds a predetermined opening degree, the operating condition of the internal combustion engine 1 is changed form warm-up operation condition to normal operation condition, immediately. Thus, even if the vehicle is accelerated from its slow traveling condition, the operating condition of the internal combustion engine 1 is never changed over during acceleration, so that no shock occurs due to an output change of the internal combustion engine 1.

When the operating condition of the internal combustion engine 1 is changed over from the warm-up operation condition to the normal operation condition, the E-ECU 23 may estimate a time in which the operating condition of the internal combustion engine 1 is changed over from the warm-up operation condition to the normal operation condition and change the operating condition of the internal combustion engine 1 gradually from the warm-up operation condition to the normal operation condition just before it receives a warm-up operation inhibit signal from the H-ECU 24.

As a method for estimating a time in which the E-ECU 23 changes the operating condition of the internal combustion engine 1 from the warm-up operation condition to the normal operation condition, for example, a method of estimating based on a requested engine output to be transmitted from the H-ECU 24 to the E-ECU 23 can be exemplified.

The requested engine output to be transmitted from the H-ECU 24 to the E-ECU 23 when the internal combustion engine 1 is warmed up is determined in the same procedure as the requested engine output to be transmitted from the H-ECU 24 to the E-ECU 23 when the vehicle is in normal traveling condition. The requested engine output when the vehicle is in the normal traveling condition is a value which should be determined on the premise that the vehicle is driven with only the output of the internal combustion engine 1 without using electric power of the battery 6. The reason why the time in which the operating condition of the internal combustion engine 1 should be changed from the warm-up operation condition to the normal operation condition according to the requested engine output to be transmitted from the H-ECU 24 to the E-ECU 23 is that, if the requested engine output to be transmitted from the H-ECU 24 to the E-ECU 23 becomes higher than the battery output or an output obtained by subtracting a predetermined margin from the battery output, the requested output exceeds the warm-up time total output immediately after that.

Meanwhile, the aforementioned battery output or the output obtained by subtracting a predetermined margin from the battery output is a value outputted according to charge condition of the battery 6. Because the E-ECU 23 cannot grasp the charge condition of the battery 6 directly, it is permissible to store a battery output obtained experimentally preliminarily or an output obtained by subtracting a predetermined margin from the battery output in a ROM of the E-ECU 23 or the E-ECU 23 may input an output signal value (value indicating the charge condition of the battery 6) of the SOC controller 16 through the E-ECU 24.

If the E-ECU 23 estimates a time in which the warm-up operation condition should be changed over to the normal operation condition and changes the operating condition of the internal combustion engine 1 gradually just before the estimated changing time, the output of the internal combustion engine is increased gradually correspondingly just before the aforementioned changing time. Thus, it is possible to suppress a quick output change of the internal combustion engine and make the output of the internal combustion engine at the aforementioned changing time agree with the requested engine output.

As described above, controller of the present invention are realized by the E-ECU 23 and the H-ECU 24.

Hereinafter, the warm-up operation control according to this embodiment will be described in detail.

Figure 2A:
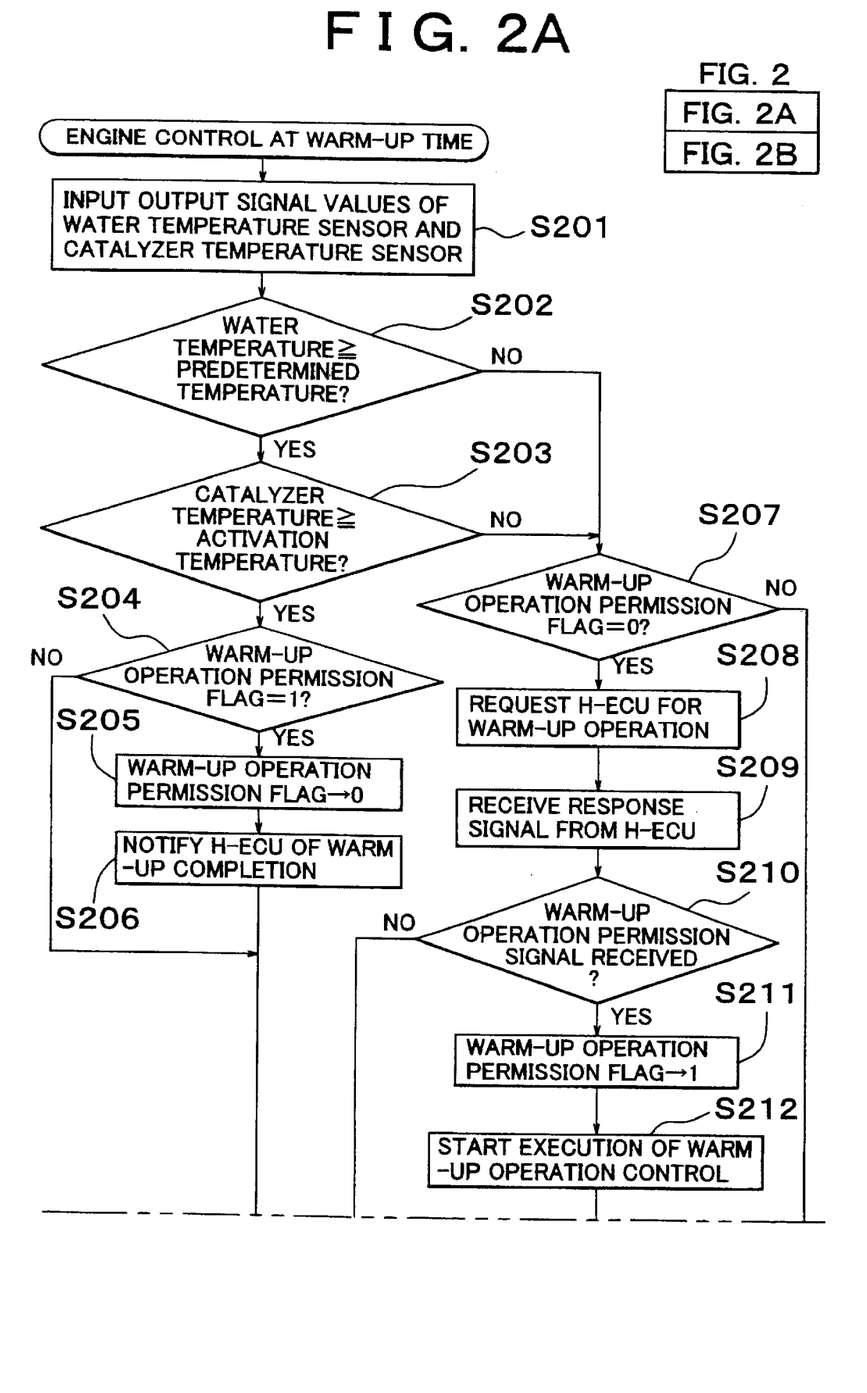
FIG. 2A and FIG. 2B are a flow chart showing warm-up time engine control routine.
Figure 2B:
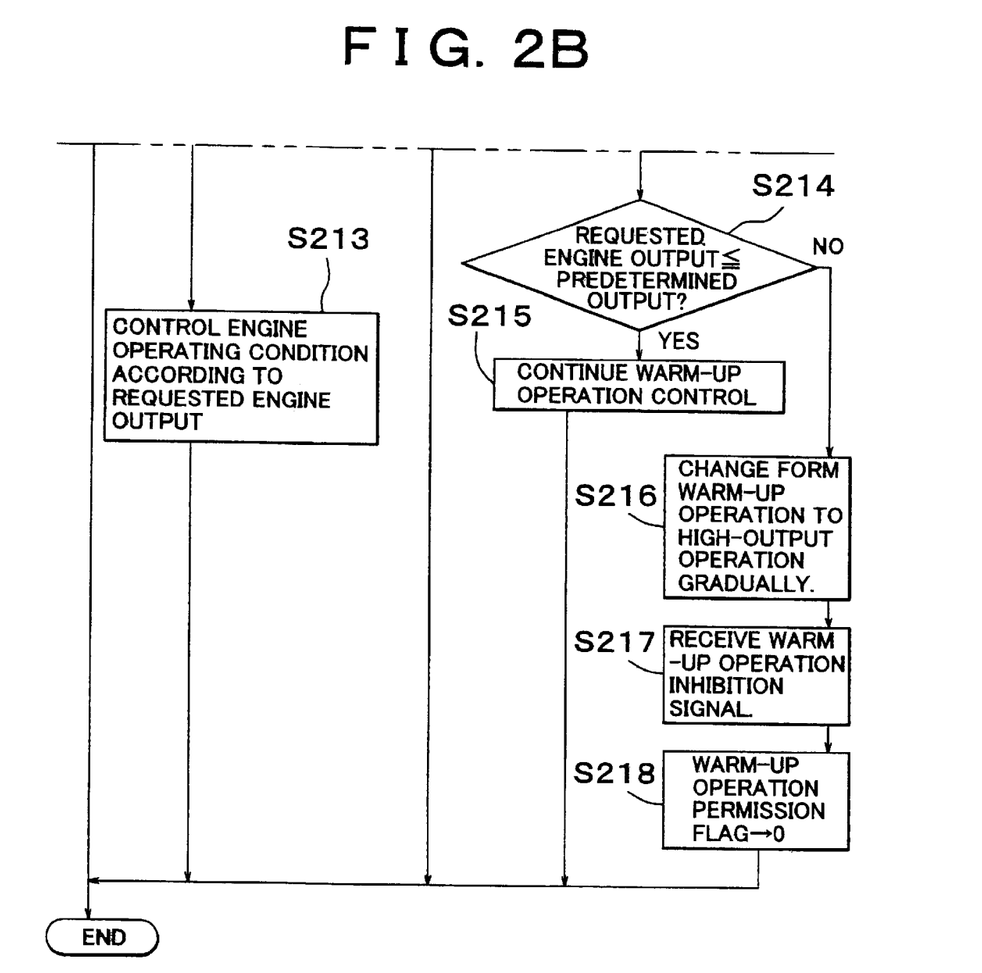

For the warm-up operation control, first, the E-ECU 23 executes warm-up time engine control routine shown in FIG. 2A and 2B. This warm-up time engine control routine is a routine stored in ROM of the E-ECU 23, which is to be executed repeatedly by the E-ECU 23 at every predetermined time.

In the warm-up time engine control routine, the E-ECU 23 inputs an output signal value (cooling water temperature) of the water temperature sensor 18 and an output signal value (catalyzer temperature) of the catalyzer temperature sensor 15 in S201.

In S202, the E-ECU 23 determines whether or not the cooling water temperature inputted in the aforementioned S201 is more than a predetermined temperature (for example, 50° C.).

If it is determined that the cooling water temperature is more than the predetermined temperature in S202, the, E-ECU 23 proceeds to S203, in which whether or not the catalyzer temperature inputted in S201 is less than a predetermined activation temperature is determined.

If it is determined that the catalyzer temperature is more than the activation temperature in S203, the E-ECU 23 recognizes that warm-ups of the internal combustion engine 1 and the emission gas purifying catalyzer 14 are completed and proceeds to S204, in which whether or not "1" is stored in the warm-up operation permission flag storage region is determined.

If it is determined that "1" is not stored in the warm-up operation permission flag storage region in S204, the E-ECU 23 terminates execution of this routine. If it is determined that "1" is stored in the warm-up operation permission flag storage region in S204, the E-ECU 23 proceeds to S205.

In S205, the E-ECU 23 resets the value of the warm-up operation permission flag storage region from "1" to "0".

In S206, the E-ECU 23 notifies the H-ECU 24 that warm-ups of the internal combustion engine 1 and the emission gas purifying catalyzer 14 are completed and then terminates execution of this routine.

On the other hand, if it is determined that the cooling water temperature is less than the predetermined temperature in S202 or if it is determined that the catalyzer temperature is less than the activation temperature in S203, the E-ECU 23 recognizes that warm-ups of the internal combustion engine 1 and the emission gas purifying catalyzer 14 are not completed and proceeds to S207.

In S207, the E-ECU 23 determines whether or not "0" is stored in the warm-up operation permission flag storage region.

If it is determined that "0" is stored in the warm-up operation permission flag storage region in S207, the E-ECU 23 transmits a warm-up operation request to the H-ECU 24 in S208.

Figure 3:
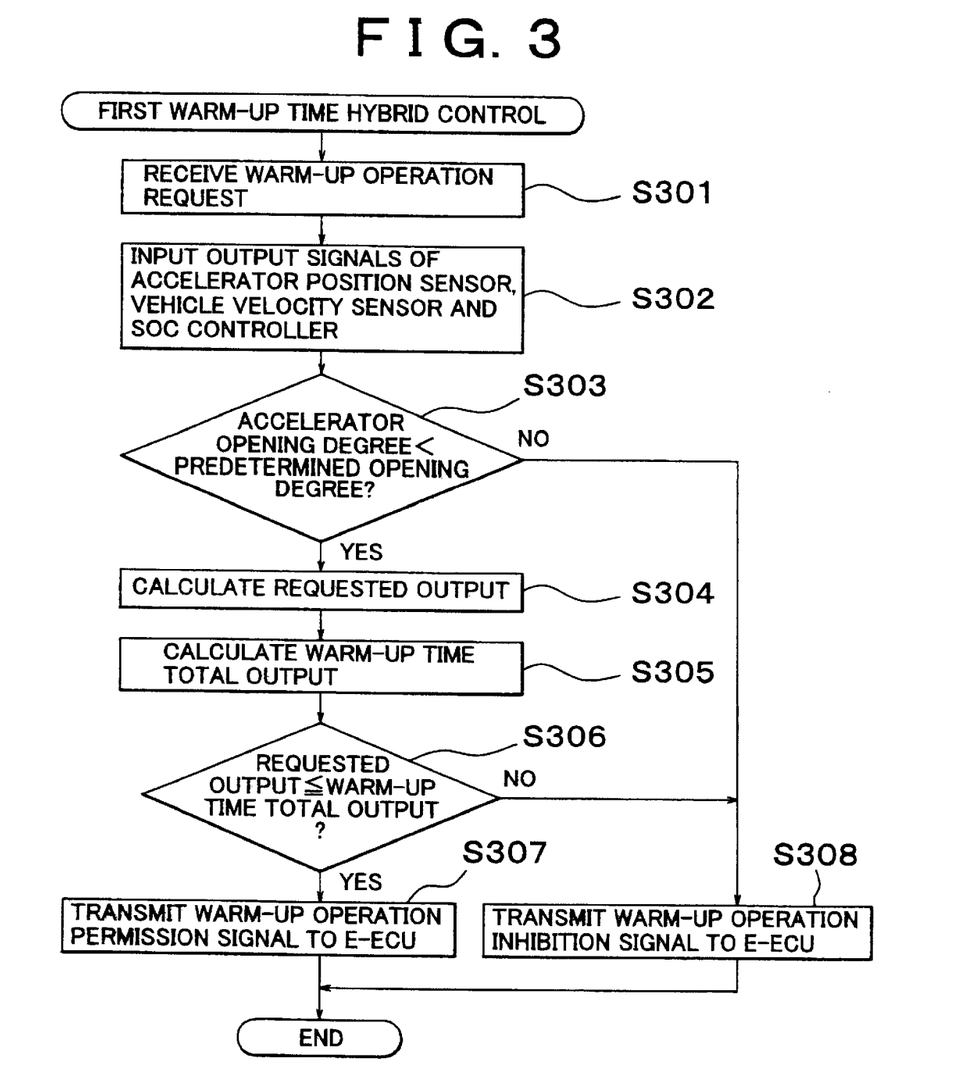
FIG. 3 is a flow chart showing hybrid control routine at the time of a first warm-up.

If the warm-up operation request is received, the H-ECU 24 executes a first warm-up time hybrid control routine shown in FIG. 3. The first warm-up time hybrid control routine is a routine stored temporarily in ROM of the H-ECU 24, which is to be triggered and executed by receiving the warm-up operation request from the E-ECU 23.

In the first warm-up time hybrid control routine, the H-ECU 24 receives a warm-up operation request from the E-ECU 23 in S301.

In S302, the H-ECU 24 inputs an output signal value (accelerator opening degree) of the accelerator position sensor 29, an output signal value (vehicle velocity) of the vehicle velocity sensor 30 and an output signal value (charge condition of the battery 6) of the SOC controller 16.

In S303, the H-ECU 24 determines whether or not an accelerator opening degree inputted in S302 is less than a predetermined opening degree. If it is determined that the accelerator opening degree is less than the predetermined opening degree in S303, the H-ECU24 proceeds to S304, in which a requested output of the hybrid mechanism is calculated according to the accelerator opening degree and vehicle velocity inputted in S302.

In S305, the H-ECU 24 calculates a maximum output (warm-up time engine output) which can be outputted by the internal combustion engine 1 in the warm-up operation condition and then calculates a maximum output (battery output) which can be obtained by applying electric power of the battery 6 to the electric motor 2 in the battery charge condition inputted in S302. Next, the H-ECU 24 sums the warm-up time engine output with the battery output to calculate a maximum output (warm-up time total output) which can be outputted by the hybrid mechanism when the warm-up operation control is being carried out.

In S306, the H-ECU 24 compares the requested output calculated in S304 with the warm-up time total output calculated in S305 so as to determine whether or not the requested output is less than the warm-up time total output. If it is determined that the requested output is less than the warm-up time total output in S306, the H-ECU 24 proceeds to S307, in which it transmits a warm-up operation permission signal to the E-ECU 23. At this time, the H-ECU 24 calculates a requested engine output according to the same procedure as when the vehicle is in normal traveling condition and transmits the calculated requested engine output to the E-ECU 23 with the warm-up operation permission signal. After the processing of S306 is terminated, the H-ECU 24 terminates execution of this routine.

On the other hand, if it is determined that the accelerator opening degree is more than the predetermined opening degree in S303 or if it is determined that the requested output is higher than the warm-up time total output in S306, the H-ECU 24 proceeds to S308, in which it transmits a warm-up operation inhibition signal to the E-ECU 23 and terminates execution of this routine.

After returning to the warm-up time engine control routine of FIG. 2A and 2B, the E-ECU 23 receives a response signal from the H-ECU 24 with respect to the warm-up operation request signal in S209.

In S210, the E-ECU 23 determines whether or not the response signal received in S209 is the warm-up operation permission signal.

If it is determined that the response signal is the warm-up operation permission signal in S210, the E-ECU 23 proceeds to S211, in which it rewrites the value stored in the warm-up operation permission flag storage region from "0" to "1".

In S212, the E-ECU 23 changes the operating condition of the internal combustion engine 1 from normal operation condition to warm-up operation condition gradually. More specifically, it controls the ignition plug 25 so as to delay the ignition timing gradually. If the processing of S212 is terminated, the E-ECU 23 terminates execution of this routine.

If it is determined that the response signal to the warm-up operation request is not the warm-up operation permission signal in S210 or if the response signal to the warm-up operation request is the warm-up inhibition signal, the E-ECU 23 proceeds to S213, in which it controls the operating condition of the internal combustion engine 1 according to the requested engine output from the H-ECU 24. If the processing of S213 is terminated, the E-ECU 23 terminates execution of this routine.

If it is determined that "1" is stored in the warm-up operation permission flag storage region in S207, the E-ECU 23 recognizes that the operating condition of the internal combustion engine 1 is the warm-up operation condition and proceeds to S214.

In S214, the E-ECU 23 inputs a new requested engine output received from the H-ECU 24 and determines whether or not the requested engine output is less than a predetermined output. The aforementioned predetermined output is the battery output or an output obtained by subtracting a predetermined margin from the battery output.

If it is determined that the requested engine output is less than the predetermined output in S214, the E-ECU 23 proceeds to S215, in which it continues the warm-up operation control of the internal combustion engine 1.

If it is determined that the requested engine output is higher than the predetermined output in S214, the E-ECU 23 estimates that a time when the operating condition of the internal combustion engine 1 should be changed from the warm-up operation condition to the normal operation condition is approaching and proceeds to S216.

In S216, the E-ECU 23 changes the operating condition of the internal combustion engine 1 from the warm-up operation condition to the normal operation condition gradually. More specifically, the E-ECU 23 controls the ignition plug 25 so as to advance the ignition timing gradually.

In S217, the E-ECU 23 receives the warm-up operation inhibition signal from the H-ECU 24. When transmitting the warm-up operation inhibition signal to the E-ECU 23, the H-ECU 24 executes a second warm-up time hybrid control routine shown in FIG. 4.

Figure 4:
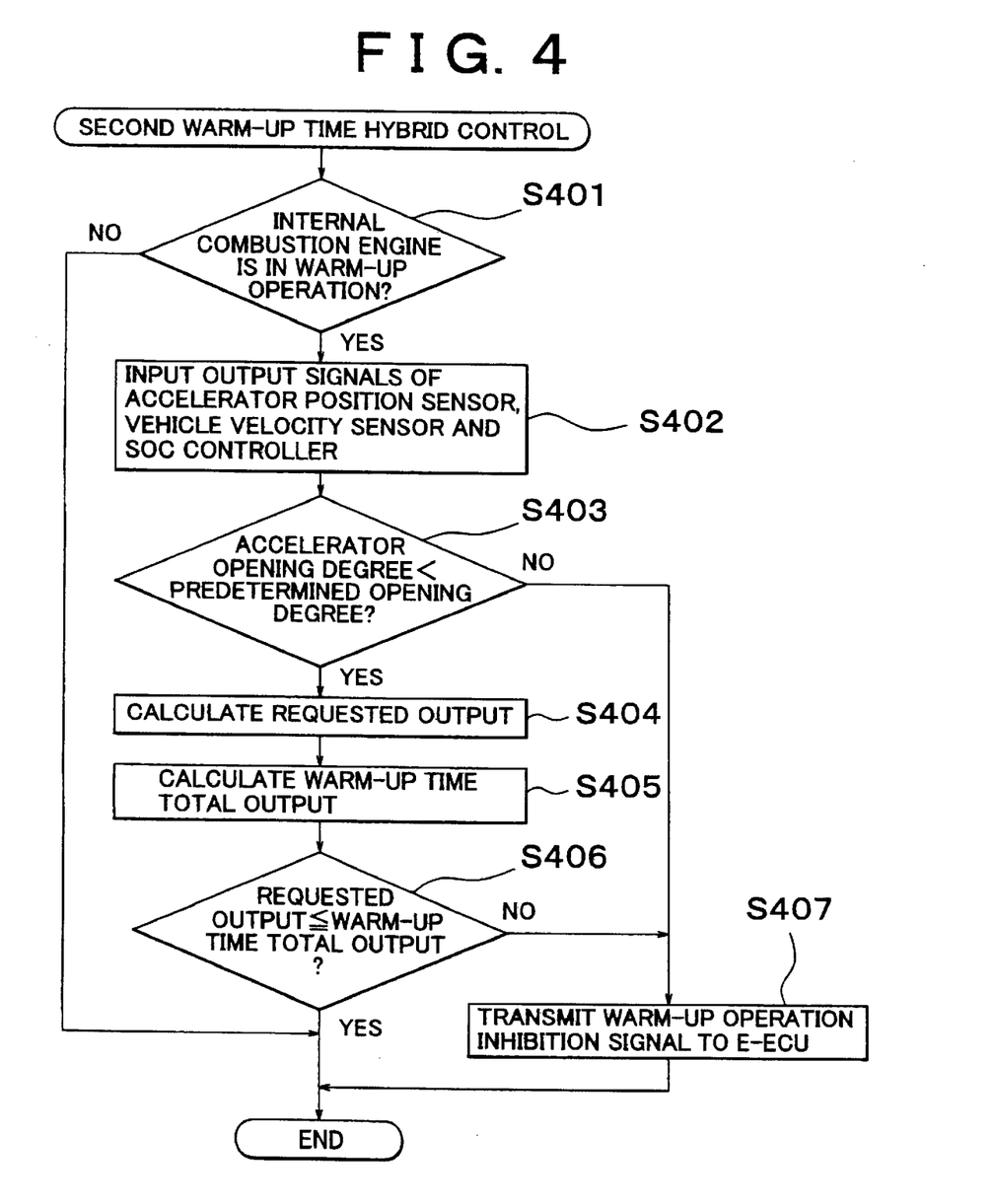
FIG. 4 is a flow chart showing hybrid control routine at the time of a second warm-up.

The second warm-up time hybrid control routine is a routine stored in ROM of the H-ECU 24, which is carried out repeatedly at every predetermined time by the H-ECU 24.

In the second warm-up time hybrid control routine, the H-ECU 24 determines whether or not the internal combustion engine 1 is in the warm-up operation condition in S401. As a method for determining whether or not the internal combustion engine 1 is in the warm-up operation condition, there is a method in which a warm-up operation permission flag storage region is provided in RAM incorporated in the H-ECU 24 like the E-ECU 23 and by determining whether or not "1" is stored in the warm-up operation permission flag storage region, it is determined whether or not the internal combustion engine 1 is in the warm-up operation condition.

If it is determined that the internal combustion engine 1 is not in the warm-up operation condition in S401, the H-ECU 24 terminates execution of this routine.

If it is determined that the internal combustion engine 1 is in the warm-up operation condition in S401, the H-ECU 24 proceeds to S402, in which it inputs an output signal value (accelerator opening degree) of the accelerator position sensor 29, an output signal value (vehicle velocity) of the vehicle velocity sensor 30 and an output signal value (charge condition of the battery 6) of the SOC controller 16.

In S403, the H-ECU 24 determines whether or not the accelerator opening degree inputted in S402 is less than a predetermined opening degree.

If it is determined that the accelerator opening degree is less than the predetermined opening degree in S403, the H-ECU 24 proceeds to S404, in which an output requested to the hybrid mechanism is calculated according to the accelerator opening degree and vehicle velocity inputted in S402.

In S405, the H-ECU 24 sums the warm-up time engine output with the battery output so as to calculate the warm-up time total output.

In S406, the H-ECU 24 compares the requested output calculated in S404 with the warm-up time total output calculated in S405 so as to determine whether or not the requested output is less than the warm-up time total output.

If it is determined that the requested output is less than the warm-up time total output in S406, the H-ECU 24 terminates execution of this routine.

If it is determined that the accelerator opening degree is more than the predetermined opening degree in S403 or if it is determined that the requested output is higher than the warm-up time total output in S406, the H-ECU 24 proceeds to S407, in which it transmits the warm-up operation inhibition signal to the E-ECU 23.

If the E-ECU 23 receives the warm-up operation inhibition signal from the H-ECU 24 in S217 after returning to the warm-up time engine control routine of FIG. 2A and 2B, it rewrites the value of the warm-up operation permission flag storage region from "1" to "0" in S218 and terminates execution of this routine.

According to the above described embodiments, if in a hybrid vehicle having two driving sources, that is, the internal combustion engine 1 and the electric motor 2, the requested output exceeds the warm-up time total output (in other words, the requested engine output exceeds the warm-up time engine output) or the accelerator opening degree exceeds a predetermined opening degree when the internal combustion engine 1 is in the warm-up operation condition, the operating condition of the internal combustion engine 1 is changed from the warm-up operation condition to the normal operation condition immediately, so that the output of the hybrid mechanism is increased quickly. As a result, the hybrid vehicle is enabled to be accelerated immediately so that drivability is improved.

Particularly if a driver operates the accelerator pedal 28 to have an opening larger than a predetermined one in order to accelerate the vehicle when the hybrid vehicle is traveling slowly while the internal combustion engine 1 is in the warm-up operation condition, even if the requested output of the hybrid mechanism is less than the warm-up time total output, the operating condition of the internal combustion engine 1 is changed from the warm-up operation condition to the normal operation condition. Thus, the operation of the internal combustion engine 1 is never changed from the warm-up operation condition to the normal operation condition during acceleration of the vehicle.

Therefore, according to this embodiment, even if the hybrid vehicle is accelerated from its slow traveling condition when the internal combustion engine 1 is in the warm-up operation condition, the operating condition of the internal combustion engine 1 is never changed over during the acceleration. Thus, it is possible to prevent an occurrence of a shock due to change over of the engine operation condition.

Further, because, according to this embodiment, time in which the operating condition of the internal combustion engine 1 should be changed over from the warm-up operation condition to the normal operation condition is estimated and the operating condition of the internal combustion engine 1 is changed over gradually prior to the estimated changing time, the output of the internal combustion engine 1 at the changing time can be adjusted to a desired output while restricting a sudden output change of the internal combustion engine. As a result, drivability of the vehicle can be improved.

Although in this embodiment, as a method for enhancing warm-up of the emission gas purifying catalyzer 14, a method of delaying the ignition timing has been mentioned, the present invention is not restricted to this method. For example, it is permissible to keep the ratio of air-fuel introduced into the emission gas purifying catalyzer 14 at a theoretical air-fuel ratio and control combustion injection amount, so that air-fuel ratio of mixed gas to be burnt in at least part of cylinders is fuel excessive atmosphere (rich atmosphere) while air-fuel ratio of mixed gas to be burnt in the other part of the cylinders is oxygen excessive atmosphere (lean atmosphere), so as to generate emission gas containing large amounts of non-burnt HC, non-burnt CO and $O_2$.

Because in this case, the emission gas introduced into the emission gas purifying catalyzer 14 contains large amounts of non-burnt HC, non-burnt CO and $O_2$, reaction among the non-burnt HC, the non-burnt CO and $O_2$ and reaction among HC, CO and $NO_x$ in the emission gas purifying catalyzer 14 are accelerated so that temperature rise speed of the emission gas purifying catalyzer 14 is improved by heat produced by these reactions.

Because, according to the above described method, combustion of mixed gas in the rich atmosphere and combustion of mixed gas in the lean atmosphere are repeated, in case of the hybrid mechanism, although a change of torque is generated in the internal combustion engine 1, drivability is never deteriorated by the change of torque of the internal combustion engine 1, because the battery 6 is employed mainly as a traveling drive source during controlling of the warm-up operation of the internal combustion engine 1. Thus, more positive warm-up operation control can be carried out as compared to a vehicle always employing the internal combustion engine as a traveling drive source. For example, when enhancing the warm-up operation in the above described method, it is permissible to enhance the warm-up operation and reduce fuel consumption by using so-called fuel-cut method in which fuel injection is omitted in a cylinder where mixed gas in oxygen excessive atmosphere is generated.

As another method for enhancing the warm-up of the emission gas purifying catalyzer 14, it is permissible to keep the ratio of air-fuel introduced into the emission gas purifying catalyzer 14 at a theoretical air-fuel ratio and control combustion injection amount, so that air-fuel ratio of mixed gas to be burnt in at least part of cylinders is fuel excessive atmosphere (rich atmosphere) while secondary air is mixed in emission gas in the upstream of the emission gas purifying catalyzer 14, so as to generate emission gas containing large amounts of non-burnt HC, non-burnt CO and $O_2$.

Because in this case, the emission gas introduced into the emission gas purifying catalyzer 14 contains large amounts of non-burnt HC, non-burnt CO and $O_2$, reaction among the non-burnt HC, the non-burnt CO and $O_2$ and reaction among HC, CO and $NO_x$ in the emission gas purifying catalyzer 14 are accelerated, so that temperature rise speed of the emission gas purifying catalyzer 14 is improved by heat produced by these reactions.

Further, as another method for activating the emission gas purifying catalyzer 14 early, it is permissible to provide the internal combustion engine 1 with a variable valve timing mechanism capable of changing an opening/closing timing of the discharge valve and control the variable valve timing mechanism so that the opening timing of the discharge valve is advanced by a predetermined period when the temperature of the emission gas purifying catalyzer 14 is less than activation temperature.

In this case, because the discharge valve is opened just after mixed gas is burnt in each cylinder of the internal combustion engine 1, the temperature of emission gas discharged from each cylinder rises, so that hot emission gas flows into the emission gas purifying catalyzer 14. As a result, the emission gas purifying catalyzer 14 receives a large amount of heat from emission gas, so that it reaches activation temperature early.

As another method for achieving activation of the emission gas purifying catalyzer 14 in early period, it is permissible to combine the above described methods. For example, it is permissible to raise the temperature of emission gas flowing into the emission gas purifying catalyzer 14 by delaying the ignition timing or advancing the discharge valve opening timing at initial phase of warm-up processing and after a predetermined time elapses from execution of the warm-up processing, control fuel injection amount (and secondary air amount) so as to generate emission gas containing large amounts of non-burnt HC, non-burnt CO and $O_2$.

That is, it is permissible to raise the temperature of the emission gas purifying catalyzer 14 by raising the temperature of emission gas flowing into the emission gas purifying catalyzer 14 when the emission gas purifying catalyzer 14 is entirely in non-activated condition and after the emission gas purifying catalyzer 14 is partially activated, achieve activation of the emission gas purifying catalyzer 14 in early period by raising the temperature of the emission gas and enhancing the reaction of the emission gas purifying catalyzer 14 at the same time.

At this time, the aforementioned predetermined time may be a fixed value set preliminarily or a variable value which is determined depending on catalyzer temperature when the catalyzer warm-up processing is started. Further, instead of the predetermined time, it is permissible to use an integrated intake air amount counted from when the catalyzer warm-up processing is started.

In the illustrated embodiment, the apparatus is controlled by the controller (e.g., the E-ECU 23 and/or the H-ECU 24), which is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An internal combustion engine control unit for a hybrid vehicle, comprising:
    a hybrid mechanism that drives the vehicle by selectively using power of the internal combustion engine and power of an electric motor; and
    a controller that drives the vehicle with the power of said electric motor as a main driving power and controls said hybrid mechanism so as to warm up said internal combustion engine, said controller inhibits warm-up operation of said internal combustion engine if at least one of conditions: (a) a requested engine output to said internal combustion engine is more than a predetermined output, and (b) an accelerator opening degree is equal or more than a predetermined opening degree, is satisfied when said internal combustion engine is being warmed up.

2. The internal combustion engine control unit according to claim 1, wherein the controller changes an operating condition of the internal combustion engine from a warm-up operation condition to another operation condition if at least one of the conditions is satisfied.

3. The internal combustion engine control unit according to claim 2, wherein the another operation condition is a condition for outputting a power depending on the requested engine output.

4. The internal combustion engine control unit according to claim 2, wherein the controller estimates a time for changing the operation condition from the warm-up operation condition to a predetermined operation condition; and changes the operation condition of the internal combustion engine gradually from the warm-up operation condition to the predetermined operation condition prior to the estimated changing time.

5. The internal combustion engine control unit according to claim 1, wherein the predetermined output is a maximum output generated by the internal combustion engine in the warm-up operation condition.

6. A method of controlling an internal combustion engine unit of a hybrid vehicle, the hybrid vehicle having a hybrid mechanism that drives the hybrid vehicle by selectively using power of the internal combustion engine and power of an electric motor, the method comprising:
    inhibiting warm-up operation of the internal combustion engine if at least one of conditions: (a) a requested engine output to said internal combustion engine is more than a predetermined output, and (b) an accelerator opening degree is equal or more than a predetermined opening degree, is satisfied when said internal combustion engine is being warmed up.

7. The method of controlling an internal combustion engine of claim 6, further comprising changing an operating condition of the internal combustion engine from a warm-up operation condition to another operation condition if at least one of the conditions is satisfied.

8. The method of controlling an internal combustion engine of claim 7, wherein the another operation condition is a condition for outputting a power depending on the requested engine output.

9. The method of controlling an internal combustion engine of claim 7, further comprising:
    estimating a time for changing the operation condition from the warm-up operation condition to a predetermined operation condition; and
    changing the operation condition of the internal combustion engine gradually from the warm-up operation condition to the predetermined operation condition prior to the estimated changing time.

10. The method of controlling an internal combustion engine of claim 6, wherein the predetermined output is a maximum output generated by the internal combustion engine in the warm-up operation condition.

* * * * *